United States Patent
Thiebaut et al.

(10) Patent No.: US 12,395,924 B2
(45) Date of Patent: Aug. 19, 2025

(54) LOCATION SERVICE ENHANCEMENT BASED ON USAGE OF AN USER PLANE INTERFACE WITH A TERMINAL DEVICE

(71) Applicant: NOKIA TECHNOLOGIES OY, Espoo (FI)

(72) Inventors: Laurent Thiebaut, Antony (FR); Mao Cai, Sichuan (CN); Shubhranshu Singh, Seeheim-Jugenheim (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/955,073

(22) Filed: Nov. 21, 2024

(65) Prior Publication Data

US 2025/0113290 A1    Apr. 3, 2025

Related U.S. Application Data

(63) Continuation of application No. 18/847,884, filed as application No. PCT/CN2022/083504 on Mar. 28, 2022.

(51) Int. Cl.
*H04W 72/04* (2023.01)
*H04L 5/00* (2006.01)
(Continued)

(52) U.S. Cl.
CPC .......... *H04W 48/16* (2013.01); *H04L 5/0048* (2013.01); *H04W 28/0925* (2020.05); *H04W 40/00* (2013.01); *H04W 64/006* (2013.01)

(58) Field of Classification Search
CPC ...... H04W 72/04; H04W 88/08; H04W 76/00
(Continued)

(56) References Cited

U.S. PATENT DOCUMENTS

2005/0138119 A1    6/2005   Saridakis
2020/0196101 A1 *  6/2020   Edge ................. H04W 4/20

FOREIGN PATENT DOCUMENTS

CN        113115480 A      7/2021
WO   WO-2020204961 A1 * 10/2020 .............. H04W 4/02

OTHER PUBLICATIONS

Nokia, Nokia Shanghai Bell (FS_eLCS_Ph3/Rel-18, S2-2202933, Apr. 16-12, 2022) (Year: 2022).*

(Continued)

*Primary Examiner* — Maharishi V Khirodhar
(74) *Attorney, Agent, or Firm* — SQUIRE PATTON BOGGS (US) LLP

(57) ABSTRACT

According to certain embodiments, a terminal device may receive location service user plane (LCUP) assistance information in a control plane (CP) positioning protocol signaling. The LCUP assistance information includes at least one of addressing information of an LCUP function instance, and security information for establishing an user plane (UP) session between the terminal device and the LCUP function instance. The LCUP function instance is associated with a location management function (LMF) selected for serving the terminal device. The terminal device can establish a secured UP connection between the terminal device and the LCUP function instance using the LCUP assistance information so as to perform a UP positioning operation using the LCUP function instance. The terminal device can ensure the UE establishes a secured connection with the LCUP associated with the serving LMF, thereby CP location operation through the UP interaction between the terminal device and the LUCP associated with LMF.

20 Claims, 5 Drawing Sheets

(51) Int. Cl.
*H04W 28/08* (2023.01)
*H04W 40/00* (2009.01)
*H04W 48/16* (2009.01)
*H04W 64/00* (2009.01)
*H04W 76/00* (2018.01)
*H04W 88/08* (2009.01)

(58) Field of Classification Search
USPC ........................................................ 370/329
See application file for complete search history.

(56) References Cited

OTHER PUBLICATIONS

International Search Report and Written Opinion dated Jan. 12, 2023 corresponding to International Patent Application No. PCT/CN2022/083504.
Nokia et al., "Further details and conclusion for Local LMF in NG-RAN," 3GPP Draft; R3-197425, 3GPP TSG-RAN WG3 Meeting #106, Reno, NV, USA, Nov. 18-22, 2019, Nov. 9, 2019.
3GPP TS 23.273 V17.4.0 (Mar. 2022), Technical Specification, 3rd Generation Partnership Project; Technical Specification Group Services and System Aspects; 5G System (5GS) Location Services (LCS); Stage 2, (Release 17), Mar. 2022.
3GPP TS 38.305 V16.7.0 (Dec. 2021), Technical Specification, 3rd Generation Partnership Project; Technical Specification Group Radio Access Network; NG Radio Access Network (NG-RAN); Stage 2 functional specification of User Equipment (UE) positioning in NG-RAN (Release 16), Dec. 2021.
3GPP TS 23.548 (V17.2.0) (Mar. 2022), Technical Specification, 3rd Generation Partnership Project; Technical Specification Group Services and System Aspects; 5G System Enhancements for Edge Computing; Stage 2 (Release 17), Mar. 2022.
3GPP TS 23.316 V17.2.0 (Dec. 2021), Technical Specification, 3rd Generation Partnership Project; Technical Specification Group Services and System Aspects; Wireless and wireline convergence access support for the 5G System (5GS) (Release 17), Dec. 2021.
3GPP TS 23.501 V17.4.0 (Mar. 2022), Technical Specification, 3rd Generation Partnership Project; Technical Specification Group Services and System Aspects; System architecture for the 5G System (5GS); Stage 2 (Release 17), Mar. 2022.
3GPP TS 23.502 V17.4.0 (Mar. 2022), Technical Specification, 3rd Generation Partnership Project; Technical Specification Group Services and System Aspects; Procedures for the 5G System (5GS); Stage 2 (Release 17), Mar. 2022.
3GPP TS 23.503 V17.4.0 (Mar. 2022), Technical Specification, 3rd Generation Partnership Project; Technical Specification Group Services and System Aspects; Policy and charging control framework for the 5G System (5GS); Stage 2 (Release 17), Mar. 2022.

* cited by examiner

LOCATION SERVICE ENHANCEMENT BASED ON USAGE OF AN USER PLANE INTERFACE WITH A TERMINAL DEVICE

CROSS REFERENCE TO RELATED APPLICATION

This is a Continuation of U.S. patent application Ser. No. 18/847,884 filed Sep. 17, 2024, which is a 371 application of International Patent Application No. PCT/CN2022/083504 filed Mar. 28, 2022. The contents of these applications are hereby incorporated by reference.

TECHNICAL FIELD

Embodiments of the present disclosure generally relate to the field of telecommunications, and in particular, to devices, methods, apparatuses and computer readable media for location service enhancement based on usage of user plane interface with a terminal device.

BACKGROUND

Some communication systems, such as New radio (NR), support location service. The location service can be provided through a control plane protocol such as LTE Positioning Protocol. In addition, a user plane positioning was proposed as a location service enhancement solution.

The key target of architectural enhancement is to identify the 3rd Generation Partnership Project (3GPP) location services (LCS) features and enhancements required to support user plane positioning.

SUMMARY

In general, example embodiments of the present disclosure provide devices, methods, apparatuses and computer readable media for location service enhancement based on user plane function.

In a first aspect, there is provided a terminal device. A terminal device comprises at least one processor; and at least one memory including computer program codes. The at least one memory and the computer program codes are configured to, with the at least one processor, cause the terminal device to: receive location service user plane (LCUP) assistance information in a control plane (CP) positioning protocol signaling, wherein the LCUP assistance information includes at least one of addressing information of an LCUP function instance, correlation information on an ongoing CP location procedure and security information for establishing an user plane (UP) session between the terminal device and the LCUP function instance, and wherein the LCUP function instance is associated with a location management function (LMF) selected for serving the terminal device; and establish a secured UP connection between the terminal device and the LCUP function instance by using the LCUP assistance information so as to perform a UP positioning operation using the LCUP function instance.

In a second aspect, there is provided a network system. The network system comprises at least one processor; and at least one memory including computer program codes. The at least one memory and the computer program codes are configured to, with the at least one processor, cause the network device to: select a location management function (LMF) serving for a terminal device in response to initiation of a control plane (CP) position procedure; transmit, from the LMF, location service user plane (LCUP) assistance information in a control plane (CP) positioning protocol signaling, wherein the LCUP assistance information includes at least one of addressing information of an LCUP function instance, correlation information on an ongoing CP location procedure and security information for establishing a user plane (UP) session between the terminal device and the LCUP function instance, and wherein the LCUP function instance is associated with the LMF selected for serving the terminal device; and establish a secured UP connection between the terminal device and the LCUP function instance using information provided by the terminal device from the LCUP assistance information in order to use the LCUP function instance to exchange positioning related information with the terminal device.

In a third aspect, there is provided a network device. The network device such as an LMF comprises at least one processor; and at least one memory including computer program codes. The at least one memory and the computer program codes are configured to, with the at least one processor, cause the network system to: transmit location service user plane (LCUP) assistance information in a control plane (CP) positioning protocol signaling, wherein the LCUP assistance information includes at least one of addressing information of an LCUP function instance, correlation information on an ongoing CP location procedure and security information for establishing a user plane (UP) session between the terminal device and the LCUP function instance, and wherein the LCUP function instance is associated with the LMF selected for serving the terminal device.

In a fourth aspect, there is provided a method. The method comprises receiving location service user plane (LCUP) assistance information in a control plane (CP) positioning protocol signaling, wherein the LCUP assistance information includes at least one of addressing information of an LCUP function instance, correlation information on an ongoing CP location procedure, and security information for establishing an user plane (UP) session between the terminal device and the LCUP function instance, and wherein the LCUP function instance is associated with a location management function (LMF) selected for serving the terminal device; establishing a secured UP connection between the terminal device and the LCUP function instance by using the LCUP assistance information so as to perform a UP positioning operation using the LCUP function instance.

In a fifth aspect, there is provided another method. The method comprises selecting a location management function (LMF) serving for a terminal device in response to initiation of a control plane (CP) position procedure; transmitting, from the LMF, location service user plane (LCUP) assistance information in a control plane (CP) positioning protocol signaling, wherein the LCUP assistance information includes at least one of addressing information of an LCUP function instance, correlation information on an ongoing CP location procedure, and security information for establishing a user plane (UP) session between the terminal device and the LCUP function instance, and wherein the LCUP function instance is associated with the LMF selected for serving the terminal device; and establishing a secured UP connection between the terminal device and the LCUP function instance using information provided by the terminal device from the LCUP assistance information in order to use the LCUP function instance to exchange positioning related information with the terminal device.

In a sixth aspect, there is provided an apparatus. The apparatus, comprises means for receiving location service user plane (LCUP) assistance information in a control plane (CP) positioning protocol signaling, wherein the LCUP assistance information includes at least one of addressing information of an LCUP function instance, correlation information on an ongoing CP location procedure, and security information for establishing an user plane (UP) session between the terminal device and the LCUP function instance, and wherein the LCUP function instance is associated with a location management function (LMF) selected for serving the terminal device; and establishing a secured UP connection between the terminal device and the LCUP function instance by using the LCUP assistance information so as to perform a UP positioning operation using the LCUP function instance.

In a seventh aspect, there is provided another apparatus. The apparatus comprises means for selecting a location management function (LMF) serving for a terminal device in response to initiation of a control plane (CP) position procedure; means for transmitting, from the LMF, location service user plane (LCUP) assistance information in a control plane (CP) positioning protocol signaling, wherein the LCUP assistance information includes at least one of addressing information of an LCUP function instance, correlation information on an ongoing CP location procedure, and security information for establishing a user plane (UP) session between the terminal device and the LCUP function instance, and wherein the LCUP function instance is associated with the LMF selected for serving the terminal device; and means for establishing a secured UP connection between the terminal device and the LCUP function instance using information provided by the terminal device from the LCUP assistance information in order to use the LCUP function instance to exchange positioning related information with the terminal device.

In an eighth aspect, there is a computer readable storage medium comprising program instructions stored thereon. The instructions, when executed by an apparatus, cause the apparatus to perform the method according to the above fourth, fifth or sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
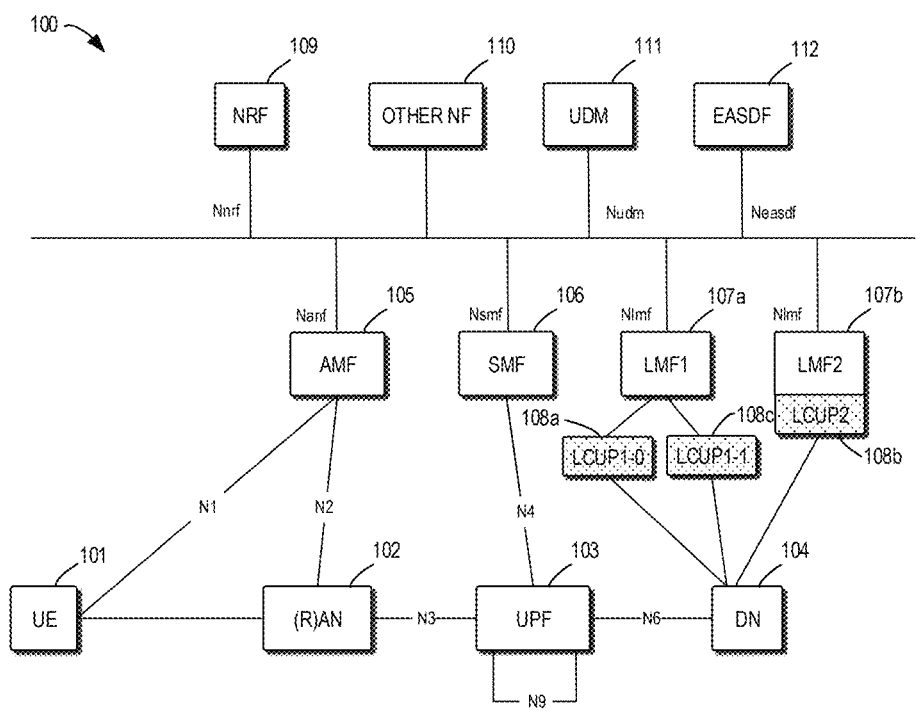
FIG. 1 illustrates an example system in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between User Equipment (UE) and a network device or communications between network devices in the communication network may be performed according to any suitable communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future such as the future sixth generation (6G). Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which UE accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, a low power node such as a femto, a pico, and so forth, depending on the applied terminology and technology. In the following description, the terms "network device", "BS", and "node" may be used interchangeably.

The term "UE" refers to any end device that may be capable of wireless communication. By way of example rather than limitation, UE may also be referred to as a communication device, terminal device, a Subscriber Station (SS), a Portable Subscriber Station, a Mobile Station (MS), or an Access Terminal (AT). The UE may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), UE-type rode side unit (RSU), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably. Some communication systems, such as New radio (NR), support location service. The location service can be provided through a control plane protocol such as LTE Positioning Protocol. In addition, a user plane positioning was further proposed as a location service enhancement solution. Therefore, architectural enhancement is required to support the user plane positioning.

The term "network element" refers to elements, functions or devices in the network system. For the 3GPP 5G system, the network may include, for example, an Access Network (AN), Radio AN (RAN), Next Generation RAN (NG-RAN), Access and Mobility Management Function (AMF), Session Management Function (SMF) 106, user plane function (UPF), Location Management Function (LMF), location service user plane (LCUP) function (a new element as proposed in the present disclosure), Unified Data Management (UDM) function, Network Exposure function (NEF), and other Network Functions (NFs) in the core network.

The user plane positioning was already proposed as a location service enhancement solution. The key target of architectural enhancement is to identify the 3GPP location service (LCS) features and enhancements required to use user plane interface between the UE and the network to improve positioning, for example, to reduce the signaling load induced by a CP initiated positioning procedure. It is to address architectural changes allowing usage of user plane interface between the UE and the network, including central deployment or deployment at the edge, e.g.

Discovery of user plane capability and configuration and selection of PDU Sessions (if needed) to be used for the communication between UE and user plane positioning interface termination.

Whether and how to enhance existing 5GS LCS architecture or related procedures to support Mobile Originating Location Request (MO-LR), Mobile Terminal-Location Request (MT-LR), Deferred MT-LR and regulatory-related positioning procedures when user plane positioning is involved.

Interaction with legacy LCS call flows and security aspect

Requirements on transport protocol e.g., if reliable transport and in sequence delivery is required.

Interaction (if any) between user plane and existing control plane solution.

User plane as a possible enhancement to control plane.

Embodiments of the present disclosure are directed to user plane discovery and enhancements to control plane enhancement. Discovery of User Plane positioning interface termination is a procedure by which UE discovers (Internet Protocol) IP address(es) of a suitable User Plane Server(s) (or Service Location Protocol (SLP) as Open Mobile Alliance (OMA) terminology) using Domain Name System (DNS).

3GPP TS 23.273 defines the current LCS architecture which involves a LMF (Location Management Function), which is the entity responsible of making the necessary computation to determine the UE location. For the purpose of UE location, it needs to obtain measurements from the New Generation (NG) Radio Access Network (RAN) and from the UE.

According to Section 4.3.1 of 3GPP TS 38.305, the standard user plane (UP) from OMA, Secure User Plane Location (SUPL) supports only part of positioning methods, as given in Table 1:

TABLE 1

Positioning methods or protocols supported by SUPL

| Method | UE-based | UE-assisted, LMF-based | NG-RAN node assisted | SUPL[Note 8] |
|---|---|---|---|---|
| A-GNSS | Yes | Yes | No | Yes |
| OTDOA [Note 1, Note 2] | No | Yes | No | Yes |
| E-CID [Note 4, Note 7] | No | Yes | Yes | Yes for E-UTRA |
| Sensor | Yes | Yes | No | No |
| WLAN | Yes | Yes | No | Yes |
| Bluetooth | No | Yes | No | No |
| TBS [Note 5] | Yes | Yes | No | Yes (MBS) |
| DL-TDOA | Yes | Yes | No | Yes |
| DL-AoD | Yes | Yes | No | Yes |
| Multi-RTT | No | Yes | Yes | Yes |
| NR E-CID | No | Yes | Yes | Yes (DL NR E-CID) |
| UL-TDOA | No | No | Yes | Yes |
| UL-AoA | No | No | Yes | Yes |

NOTE 1:
This includes TBS positioning based on PRS signals.
NOTE 2:
In this version of the specification only OTDOA based on LTE signals is supported.
NOTE 3:
Void
NOTE 4:
This includes Cell-ID for NR method when UE is served by gNB.
NOTE 5:
In this version of the specification only for TBS positioning based on MBS signals.
NOTE 6:
Void
NOTE 7:
Enhanced Cell ID based on LTE signals.
NOTE 8:
This shows whether the positioning method is supported by SUPL ULP [16].

In the above table, a number of positioning methods or protocols are given, wherein A-GNSS denotes a positioning method based on Assisted Global Navigation Satellite System; OTDOA denotes a positioning method based on Observed Time Difference Of Arrival; E-CID denotes enhanced Cell ID; sensor denotes a positioning method based on sensors; WLAN denotes a positioning method based on Wireless Local Area Network; Bluetooth denotes a positioning method based on Bluetooth; DL-TDOA denotes a positioning method based on Downlink time difference of arrival; DL-AoD denotes a positioning method based on Downlink Angle of Departure, Multi-RTT denotes a positioning method based on multi-cell round trip time; UL-TDOA denotes a positioning method based on Uplink time difference of arrival; and UL-AoA denotes a positioning method based on Uplink angle-of-arrival. From the above table, it can be seen that the SUPL can only provide partial measurements for the Multi-RTT method.

For User Plane LCS, the SLP instance is defined by Open Mobile Alliance (OMA) SLP FQDN specifications, reference can be made to
  For emergency, it is in Section 6.1.5.1 in OMA-TS-ULP-V2_0_6-20200804-A (industry vendors mostly follow this approved spec)
  For non-emergency, it is not well defined in approved OMA spec, but candidate spec of 3.0 has Section 6.4 of OMA-TS-ULP-V3_0-20181213-C
Both approaches mentioned above use H-SLP (non-emergency) or E-SLP (for emergency) FQDN to locate the SLP server.

Embodiments of the present disclosure propose assuming architecture where the LMF can use a mixture of CP (Control Plane) and UP (User Plane) interactions for a single LCS request. The LMF uses CP interaction to interact with the e.g. NG RAN or UE to e.g. require an NG RAN to send signals to the UE or to measure some signals from the UE, and uses UP interactions with UE after a short CP interaction with the UE to require the UE to send signals to the NG RAN or to report measurements made on some signals from the NG RAN.

Embodiments of the present disclosure are to provide enhancement to legacy 3GPP Control Plane (CP) specifications to integrate UP communication between the UE and the LCS functionalities in the network.

Example Environments

FIG. 1 shows an example system 100 of the present disclosure in which example embodiments can be implemented. As illustrated in FIG. 1, the system 100 includes a terminal device such as User Equipment (UE) 101. UE 101 is an example of terminal device but the present disclosure is not limited thereto; instead, it could be any type of terminal device such as a vehicle, etc. and the system 100 could include any numbers of UE.

UE 101 is commutatively connected to an Access Network or Radio Access Network RAN 102. RAN 102 can be for example, a Next-Generation Radio Access Network (NG-RAN) which is an access network of the 3GPP 5G System.

UE 101 is further commutatively connected with Access and Mobility Management Function (AMF) 105. AMF 105 is a portal for the RAN 102 to access the core network of the 3GPP 5G system. The AMF can provide access control and mobility management function and communicate with other network elements in the core network through interface Nanf. AMF 105 is also communicatively connected to RAN 102 through interfaces N2.

RAN 102 is further commutatively connected with User Plane Function UPF 103 through interface N3. As an important element in the core network of the 3GPP 5G system, a user plane function (UPF) 103 is responsible for data packet routing and forwarding on the user plane. UPF 102 is communicatively connected with Session Management Function (SMF) 106 and a Data Network (DN) 104 through interfaces N4 and N6.

SMF 105 is a network element in the core network for session management, particularly responsible for interacting with the user plane, creating, updating, deleting sessions and managing session context with UPF 103. Meanwhile, SMF 105 can be communicated with other network elements through Nsmf.

DN 104 is a network for providing network data service to UE, which can be for example, an Operator Network, Internet, a third party service network, etc.

Location Management Function (LMF1) 107a and LMF2 107b are two location management functions on the control plane in the core network. They coordinate and schedule resources required for managing UE's locations and provide location and speed computation and verification. LMF1 107*a* and LMF2 107*b* can receive a location request for UE or from AMF through interface Nlmf, communicate with UE on the control plane to exchange location information suitable for a UE assisted or UE based positioning method and interact with other network element such as NG-RAN, Non-3GPP InterWorking Function, etc. to obtain location information.

Specially, embodiments of the present disclosure propose arranging one or more associated or matched LCS user plane (LCUP) function for LMF; for example LMF1 107*a* may be associated with LCUP1-0 108*a* and LCUP1-1 108*c* while LMF2 107*b* may be associated with LCUP2 108*b*. The term "LCUP" used herein means a network element or a network function for location service on the user plane, which may e.g. correspond to user plane part of the LMF or to an SUPL location platform defined OMA specification.

The LCUP function handles location operations on the user plane and can be used with the associated LMF, for example to enhance location service on the control plane. The LMF and the associated LCUP can be located within the same region, for example, co-located with each other or may communicate via an interface or implementation specific behavior. Additional or alternatively, the LMF and the associated LCUP can also support similar positioning methods so that they can match each other. However, embodiments of the present disclosure are not limited thereto; it is possible to be associated with each other based on other factors. In addition, it is to be noted that LMF1 107*a* and LMF2 107*b* are given only for illustration purposes, the system 100 can include more numbers of LMFs. In addition, an LMF can be associated with one LCUP, and it is possible to be associated with more than on LCUPs. Or alternatively, an LCUP is also possible to be associated with more than one LMF, dependent on specific system implementations. Additionally, each LCUP can be communicatively connected with the DN 104.

The system 100 also comprises a Network Repository Function (NRF) 109 which functions as a centralized repository for all network functions (NFs) in the operator network and provides a record of all NFs together with the profile thereof and supported services.

Unified Data Management (UDM) function 111 provides a data management on network user data in a centralized way and particularly manages data for access authorization, user registration, and data network profiles. The UDM provides service through Nudm to AMF, SMF, and other NFs such as Network Exposure function (NEF), which is located between the 5G core network and external third-party application functionaries, and responsible for managing the external open network data, and all external applications that want to access the internal data of the 5G core must pass through the NEF.

Edge Application Server Discovery Function (EASDF) 112 acts as a Domain Name System (DNS) resolver to the UE and can complement the DNS queries with UE location-related information, which enables the DNS system to resolve to application servers close to the UE location. The EASDF can communicate with other NFs through Neasdf interface.

In addition, the system also includes other NFs such NEF, Policy Charging Function (PCF), Application Function (AF), etc., and they all can communicate with other network elements in the core network through their respective interfaces. It is to be noted that these other NF(s) are not depicted in FIG. 1 just for simplification purposes.

Example embodiments of the present disclosure relate to User Plane communication between UE being localized by a LMF 107*a*, 107*b* and the LMF 107*a*, 107*b* via a LCUP entity determined by the LMF, in order to enhance the CP positioning. One of objectives of the present disclosure is to enable that the UE will contact over the UP an LCUP that corresponds to the User Plane termination of the LMF serving a terminal device.

To this end, embodiments of the present disclosure propose providing from the network LCUP instance assistance information to the UE so that a secured UP connection can be established between the UE and the proper LCUP. In such a way, UP interactions can be performed between the UE and the proper LUCP to enhance the corresponding CP location procedure.

Embodiments of the present disclosure can be implemented within system 100 as illustrated in FIG. 1; however, it is to be understood that FIG. 1 is illustrated merely for the purpose of illustration without suggesting any limitation to the protection scope. Instead, embodiments of the present disclosure can be implemented in other communication systems with similar CP location service enhancement requirements.

Hereinafter, some example embodiments will be detailed with reference to FIGS. 2 to 6.

Example Methods

Figure 2:
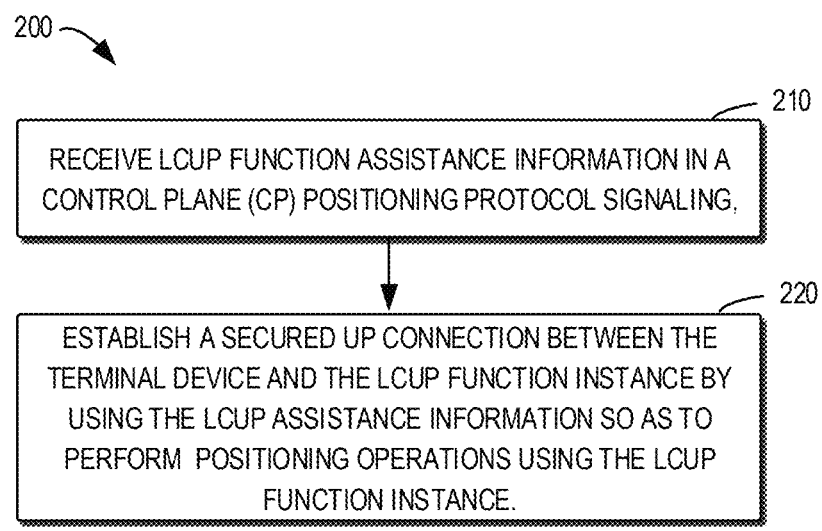
FIG. 2 illustrates a flowchart of an example method according to some example embodiments of the present disclosure.

FIG. 2 illustrates a flow chart of an example method 200 for e location service enhancement based on user plane function according to some example embodiments of the present disclosure. The method could be performed at a terminal device such as UE, or any other terminal devices with CP location service enhancement requirements.

The method 200 can start after a user plane is involved in a CP location procedure, for example a 3GPP defined MT-LR procedure, MO-LR procedure or NI-LR procedure. In addition, the UP interface between UE and LMF may be direct or indirect, (i.e., supporting proxy mode or non-proxy mode defined by OMA SUPL specifications). As mentioned, in response to the location request, the AMF could select an LMF instance as a serving LMF for the terminal device and requests the LMF to carry out the location operation using Nlmf_Location_DetermineLocation message. The LMF can have an associated LCUP for the location operation, but it shall ensure the terminal could connect the associated LCUP on the UP. Therefore, method 200 could be implemented as follows.

As illustrated in FIG. 2, at block 210, the terminal device may receive location service user plane (LCUP) assistance information in a control plane (CP) positioning protocol signaling (for example an LTE Positioning Protocol (LPP) signaling), from the network. The LCUP assistance information contains information for assisting UP connection establishment between the UE and LCUP. The LCUP assistance information could include at least one of addressing information of an LCUP function instance, correlation information on an ongoing CP location procedure and security information for establishing a user plane (UP) session between the terminal device and the LCUP function instance. Specially, the LCUP function instance is associated with a location management function (LMF) selected for serving the terminal device.

The LCUP assistance information can be received in many different ways. In some example embodiments of the present disclosure, the LCUP assistance information can be contained in a capability request/indication message. Such a capability/indication request message is transmitted by the network (for example LMF) to indicate that the network supports a user plane function for location purposes, to require the UE to report its capability. This capability/indication request message can contain the LCUP assistance information. In response to receipt of the capability indication message, the terminal device may send a capability indication response message to the network to indicate that the terminal device supports the user plane function for location purposes. In addition, the terminal could spontaneously send a LPP signaling to indicate the terminal device supports the user plane function for location purposes, too.

In some embodiments of the present disclosure, the LCUP assistance information can be contained within an assistance providing message. In some embodiments of the present disclosure, the assistance providing message can be transmitted from the network (for example LMF) as a response to an assistance request message; the assistance request message is transmitted from the terminal device to ask the network for positioning assistance data. In some embodiments of the present disclosure, the assistance providing message can also be transmitted from the network, spontaneously, instead of responding to a terminal device's request.

In cases when UE's Request Assistance LPP message is already taken as payload in the Nlmf_Location_Determin-Location request from the AMF, the LCUP assistance information could be provided in the replied Provide Assistance LPP message to send to the terminal device via the AMF and the NG RAN.

In some embodiments of the present disclosure, the LCUP assistance information includes addressing information of an LCUP function instance. As mentioned above, when a LCUP is used for a LCS procedure, it is needed to ensure that the LCUP that will be used by the UE can match the LMF that has been selected by the AMF. To this end, the addressing information could be provided from, for example, the LMF, and used by the terminal device to contact the LCUP to establish a UP connection with the LCUP.

In some example embodiments of the present disclosure, the addressing information could be for example a full qualified domain name (FQDN) specific to a LCUP function instance. This means different FQDNs for different LUCP function instances. An FQDN could for example uniquely identify a LUCP function instance.

In some embodiments of the present application, a standard defined FQDN range such like *.LMF.5gc.mnc<MNC>.mcc<MCC>0.3gppnetwork.org can be used s the FQDN to reach any LCUP in the PLMN defined by (<MCC>, <MNC>). The wildcard parameter "*" within FQDN may have different values for different LCUP instances. For example, for an LCUP instance, be the FQDN could Beijing3.LMF.5gc.mnc<MNC>.mcc<MCC>0.3gppnetwork.org; for another LCUP instance, it could be Shanghai2.LMF.5gc.mnc<MNC>.mcc<MCC>0.3gppnetwork.org.

Such a specific FQDN can be used together with the URSP rules to ensure that the device is using a PDU Session to a proper DNN (Data Network Name) and network slice S-NSSAI to reach the LUCP associated with the LMF selected by the AMF.

In some embodiments of the present disclosure, when LCUP is deployed in a network, an Operation Administration and Maintenance (OAM) instance associated with the management of location capabilities in the network, acting e.g. as an AF, could provide PCF with guidance for USRP rule setting for terminal device, for example UE as defined in TS 23.548, Section 6.6. Such guidance could be used by a PCF instance to set USRP rules. The USRP Rules can map FQDNs of different LCUP instances to proper Data Network and slices identified by the relevant data network name DNN and Single Network Slice Selection Assistance Information (S-NSSAI). In addition, the AF could further configure EAS Deployment Information (EDI) related with the LCUP instances via the procedure defined in 3GPP 23.548 Section 6.2.3.4. The EDI could be used as documented in 3GPP TS 23.548 in following IP address query operation.

Then, the PCF (in, for example, a Home Public Land Mobile Network (HPLMN)) could send the URSP rules to the UE. Thus, through the URSP rules, the UE is enabled to select the proper dnn+slice (thus a proper PDU Session) to reach the LCUP in the HPLMN and in each Visited Public Land Mobile Network (VPLMN) with which the HPLMN has a roaming agreement. By means of the URSP Rules, the terminal device could map the standard defined FQDN ranges as mentioned above to the relevant dnn+slice to use in the serving PLMN for the UP communication between UE and LCUP. For a roaming scenario, as part of the roaming agreement, the VPLMN will provide to the HPLMN the proper dnn+slice. In such a roaming case, this PDU Session works in LBO Local BreakOut mode. The URSP rules can be sent to the UE using existing PCF interface and thus the URSP structure does not need to be modified.

In some embodiments of the present disclosure, the LCUP instance assistance information may alternatively or additionally include security information for establishing a user plane (UP) session between the terminal device and the LCUP function instance. The security information can include security material that UE could use to setup the User Plane session between the UE and the LCUP. In some embodiments of the present disclosure, the security information may comprise transport layer security (TLS) attribute information for establishing the secured UP connection. The TLS attribute information may e.g. correspond to a key to be used as a pre-shared key to secure the TLS link between the UE and the LCUP. It may be used to establish SSL/TLS connection between UE and LCUP. In some embodiments, the security information may further comprise a hash-based message authentication code field for example when UE wants to start the session by SUPL Position Initialization (POS INIT) message to initiate the positioning protocol session. However, such a field will be not needed if UE starts the session by SUPL START message as an initial message.

In some embodiments of the present disclosure, the LCUP instance assistance information may alternatively or additionally include correlation information on an ongoing CP location procedure. The correlation information contains information used to correlate an ongoing CP location procedure with the UP connection to further ensure the security of the UP connection. A network element such as a LMF could allocate a correlation identifier as correlation information to a positioning request, which may contain for example, a LMF address and a positioning request identifier. The LMF could provide the correlation identifier to the terminal device as part of the LCUP assistance information over CP, for example via the LPP signaling. In later operation of establishing UP connection between the terminal device and the LUCP, the correlation identifier can be used to correlate an ongoing CP location procedure with the UP connection, which will be described hereinafter.

The LCUP assistance information further contains information on a port at the LCUP function instance, for example a TCP or UDP port at the LCUP. Additionally or alternatively, the LCUP assistance information may also include information on positioning methods or protocols supported by the LCUP function instance, such as those given in Table 1. By means of the information, a secured UP connection can be established as described with reference to block 220.

Reference is made to FIG. 2, in 220, the terminal device establishes a secured UP connection between the terminal device and the LCUP function instance by using the LCUP assistance information so as to perform positioning operations using the LCUP function instance.

In some embodiments of the present disclosure, the terminal device could establish a secured connection with the LCUP instance by using at least one of the correlation information and the security information received in the LCUP assistance information, wherein the correlation information is to identify a corresponding on-going location procedure associated with the secured connection. The LMF maps the LCS requests about the UE with the UP data path with the UE via the LCUP. Thus, the LCS operation can take place using the LCUP for communication between the LMF and the UE In cases where the security information comprises transport layer security attribute information for establishing the secured UP connection, the terminal device may use such security information to establish SSL/TLS connection between UE and LCUP. The transport layer security attribute information may e.g. correspond to a key to be used as a pre-shared key to secure the TLS link between the UE and the LCUP. In cases where the security information comprises a hash-based message authentication code field, the terminal device could use this authentication code field during establish the UP connection so as to initiate the positioning protocol session by sending a SUPL Position Initialization (POS INIT) message. However, as indicated above, such a field will be not needed if UE starts the session by SUPL START message as an initial message.

In some embodiments of the present disclosure, the IP address of the LUCP can be obtained through a DNS query. For example, the terminal device could transmit a domain name server (DNS) request to translate the FQDN of the LCUP function instance into one or more IP addresses to be used to reach this LCUP.

In some embodiments of the present disclosure, at least an IP address of the LCUP function instance can be obtained through a protocol data unit (PDU) session selected or established based on the FQDN of the UP instance and UE routing selection policy (URSP) rule containing information on routing rules related to different FQDN ranges. It is to be noted that the terminal device may receive more than one IP addresses and the terminal device could use randomly one of them to establish the UP connection or using address selection rules carried in the DNS answer.

In order to enable the DNS query, the terminal device can select or establish a protocol data unit (PDU) session based on the FQDN of the UP instance and UE routing selection policy (URSP) rule containing information on routing rules related to different FQDN ranges, in order to communicate with the LCUP function instance. For example, the PDU session can be selected or established by mapping a FQDN range corresponding to the FQDN of the LCUP function instance to a data network name and a network slice based on the URSP rules.

In some embodiments of the present application, at the network, an Edge Application Server Discovery Function (EASDF) may be determined for the PDU session and be configured with a domain name server message handling rules according to EASDF Deployment Information associated with a FQDN range associated with the LCUP. If the SMF has been configured to use an EASDF for the PDU Session (for the dnn+slice) the SMF selects, inserts and controls an EASDF (as defined in 3GPP TS 23.548 Section 6.2). The SMF can configure the EASDF for the session with DNS message handling rules referring to the EDI configured by AF associated with the standard defined FQDN range (*.LMF.5gc.mncMNC>.mcc<MCC>0.3gppnetwork.org) in order to trigger offload for the related traffic.

In some embodiments of the present disclosure, there is no suitable on-going PDU session between the terminal device and the network, the terminal device may transmit a PDU session establishment request to the network to establish the PDU session using the full qualified domain name (FQDN) of the UP instance and the UE routing selection policy (URSP) to determine the PDU Session parameters. For example, the terminal device could try to contact the LCUP with FQDN contained in the LCUP instance assistance information received from the LMF and establish a relevant PDU Session to relevant dnn+slice that are determined by means of URSP rules. The terminal device may receive a PDU session establishment complete message from the network as a response to the PDU session establishment request.

In some embodiments of the present disclosure, EASDF is configured for the session. In such a case, EASDF can be used to ensure a local LCUP function instance to be used in determining an IP address of the LCUP function instance. The network can reuse R17 EASDF with EDI (EASDF Deployment Information) referring to the standard defined FQDN range (*.LMF.5gc.mnc<MNC>.mcc<MCC>0.3gpp-network.org) in order to trigger offload for this traffic. For example, the UE issues a DNS request and the EASDF adds location information to this request in order for the authoritative DNS to determine the proper local instance and triggers SMF to insert the proper UPF for traffic offload.

It is to be noted that usage of EASDF might not be required if the SMF is configured to use a very local PSA (PDU Session Anchor) UPF for the dnn+slice being used.

It is noted that there is an alternative solution for the delivery of the LCUP address to the UE. The SUPL has already defined an OMA Push over SMS transfer or s UDP Push of this information. It is possible to deliver the LCUP address by means of such push mechanism; however, the delay in delivery of the push mechanism is un-predictable.

Figure 3:
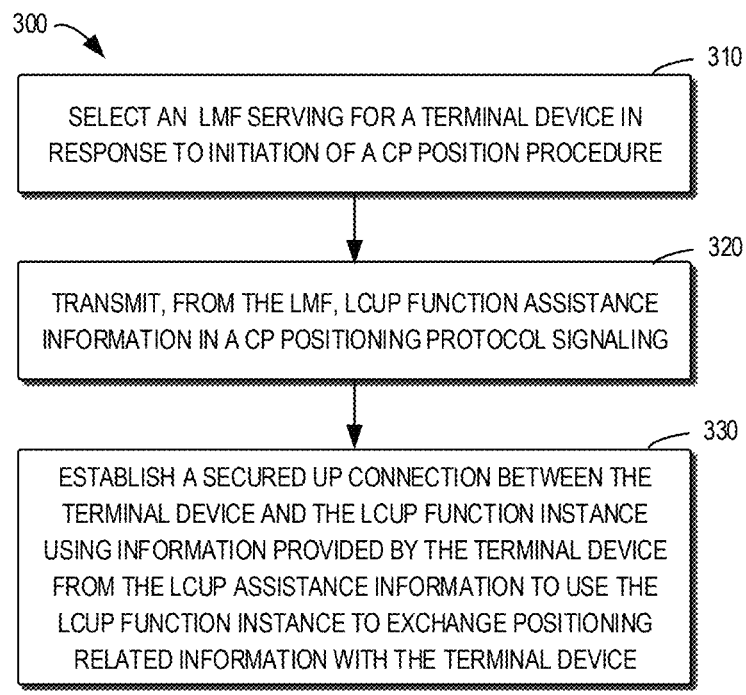
FIG. 3 illustrates a flowchart of an example method according to some example embodiments of the present disclosure.

FIG. 3 illustrates a flow chart of an example method 300 for establishing UP connection for enhancement to CP location service according to some example embodiments of the present disclosure. The method could be performed at a network system such as a core network of 3GPP 5G system or any other network system with the CP location service enhancement requirements.

As illustrated in FIG. 3, in block 310, the AMF may select an LMF serving for a terminal device in response to an initiation of control plane (CP) position procedure.

As mentioned above, a CP location procedure can be initiated in many different ways. The CP location procedure can be for example a 3GPP defined MT-LR procedure, MO-LR procedure or NI-LR procedure. The GMLC could send a Namf_Location_ProvidePositioning Info to AMF through Namf interface to request AMF provide a CP location service. The AMF selects a LMF for serving the UE with the CP location service and further inform the selected LMF to carry out the location operation.

In block 320, the LMF may transmit location service user plane (LCUP) assistance information in a control plane (CP) positioning protocol signaling. The LCUP assistance information includes at least one of addressing information of an LCUP function instance, correlation information on an ongoing CP location procedure and security information for establishing a user plane (UP) session between the terminal device and the LCUP function instance. Specially, the LCUP function instance is associated with the LMF selected for serving the terminal device.

As described with reference to FIG. 2, the LCUP assistance information can be provided to the terminal device in many different ways. In some embodiments of the present disclosure, the LCUP assistance information can be contained in a capability indication message. In some embodiments of the present disclosure, the LCUP assistance information can be contained within an assistance providing message. Any CP positioning related signaling may actually be used for LMF to deliver the LCUP assistance information to the terminal device.

In some embodiments of the present disclosure, the LCUP assistance information includes addressing information of an LCUP function instance. The addressing information could be for example a full qualified domain name (FQDN) specific to a LCUP function instance.

In some embodiments of the present application, a standard defined FQDN range such like *.LMF.5gc.mnc<MNC>.mcc<MCC>0.3gppnetwork.org can be used for UE as the FQDN to reach any LCUP in the PLMN defined by (<MCC>, <MNC>). The specific FQDN can be used together the pre-configured URSP rules to route the traffic exchanged with the selected LCUP instance to the proper data network (identified in 5G networks by DNN) and network slice (identified in 5G networks by S-NSSAI). The pre-configured URSP rules can be configured by PCF according to guidance for URSP setting from an AF. In addition, the AF could further configure EAS Deployment Information (EDI) related with the LCUP instance via the procedure, defined in 3GPP 23.548 Section 6.2.3.4.

In some embodiments of the present disclosure, the network for example the PCF may transmit, to the terminal device, UE routing selection policy (URSP) rules containing information on routing rules related to different FQDN ranges in order to communicate with the LCUP function.

In some embodiments of the present disclosure, the LCUP instance assistance information may alternatively or additionally include security information for establishing a user plane (UP) session between the terminal device and the LCUP function instance. The security information may comprise for example transport layer security attribute information for establishing the secured UP connection, for establishing SSL/TLS connection between UE and LCUP. In some embodiments, the security information may further comprise a hash-based message authentication code field for example when UE wants to start the session by SUPL Position Initialization (POS INIT) message to initiate the positioning protocol session.

In some embodiments of the present disclosure, the LCUP instance assistance information may alternatively or additionally include correlation information on an ongoing CP location procedure. The correlation information contains information used to correlate an ongoing CP location procedure with the UP connection, so as to further ensure the security of the UP connection. The correlation information may include a correlation identifier containing a LMF address and a positioning request identifier. The LMF could allocate a correlation identifier as correlation information to a positioning request, which may contain for example, a LMF address and a positioning request identifier and provide the correlation identifier to the terminal device as part of the LCUP assistance information over CP, for example via an LPP signaling.

The LCUP assistance information further contains information on a port at the LCUP function instance, for example a TCP or UDP port at the LCUP. Additionally or alternatively, the LCUP assistance information may also include information on positioning methods or protocols supported via the LCUP function instance, such as those given in Table 1.

In block 330, the LCPU may establish a secured UP connection between the terminal device and the LCUP function instance using information provided by the terminal device from the LCUP assistance information in order to use the LCUP function instance to exchange positioning related information with the terminal device.

In some embodiments of the present disclosure, the terminal device could establish a secured connection with the LCUP instance by using at least one of the addressing information, the correlation information and the security information received in the LCUP assistance information, wherein the correlation information is to identify a corresponding on-going location procedure associated with the secured connection.

In some embodiments of the present disclosure, the UE can contact the LCUP and establish a secured connection with the LCUP using at the security information. The security information may include for example transport layer security (TLS) attribute information for establishing the secured UP connection. The TLS attribute information may e.g. correspond to a key to be used as a pre-shared key to secure the TLS link between the UE and the LCUP, and The LCF may use it to establish SSL/TLS connection between UE and LCUP. In some embodiments, the security information may further comprise a hash-based message authentication code field for example when UE wants to start the session by SUPL POS INIT message to initiate the positioning protocol session.

In some embodiments of the present disclosure, the network system can receive alternatively or additionally correlation information on an ongoing CP location procedure from a terminal device that contacts the LCUP to establish a UP connection. The correlation information may include a correlation identifier allocated by for example LMF for a position request. The correlation identifier may contain, for example, a LMF address and a positioning request identifier, or other information capable of correlating the UP connection with a proper CP location procedure.

By means of the LMF address contained in the correlation identifier, the LCUP could contact the proper LMF and provide the position request identifier to this LMF. The LMF can in turn use the positioning request identifier to retrieve the on-going positioning request for this device and map the LCS requests about the UE with the UP data path with the UE via the LCUP. Thus, the LCS operation can take place using the LCUP for communication. Thus, further security could be ensured since only the device that has received the correlation information (sent over secured CP) can be correlated to the on-going positioning request via UP signaling exchanges.

The terminal device communicates with the network system to obtain an IP address of the LCUP instance on a PDU session, which is selected or established by the terminal device through mapping a FQDN range corresponding to the FQDN of the LCUP function instance to a data network name and a network slice based on the URSP rules.

When there is no proper on-going PDU session between the terminal device, the network system may establish a Protocol Data Unit (PDU) session in response to a PDU session establishment request from the terminal device; and transmit a PDU session establishment complete message to the terminal device.

If the SMF has been configured to use an EASDF for the PDU Session, the SMF can select, insert and control an EASDF. The SMF can configure the EASDF for the session with DNS message handling rules referring to the EDI provided by AF.

In some embodiments of the present disclosure, an EASDF is configured for the session, and the EASDF can be used to ensure a local LCUP function instance to be used in determining an IP address of the LCUP function instance.

It is to be noted that the most operations at the network side substantially correspond to those at UE side, and therefore operations at the network side are not elaborated. For details, reference could be made to those operations at UE side as described in conjunction with FIG. 2

By means of embodiments of the present disclosure, the UE could exchange LCS user plane (UP) interaction with a LCUP associated with the LMF serving the terminal device. In such a way, CP location operation could be enhanced effectively and efficiently through the UP interaction between the terminal device and the LUCP associated with LMF. In addition, in some embodiments of the present disclosure, it is also possible to ensure that the UE contacting the LCUP is the same UE subject to a LCS procedure involving the corresponding LMF, thereby ensure security of the UP connection.

Example Process

Figure 4:
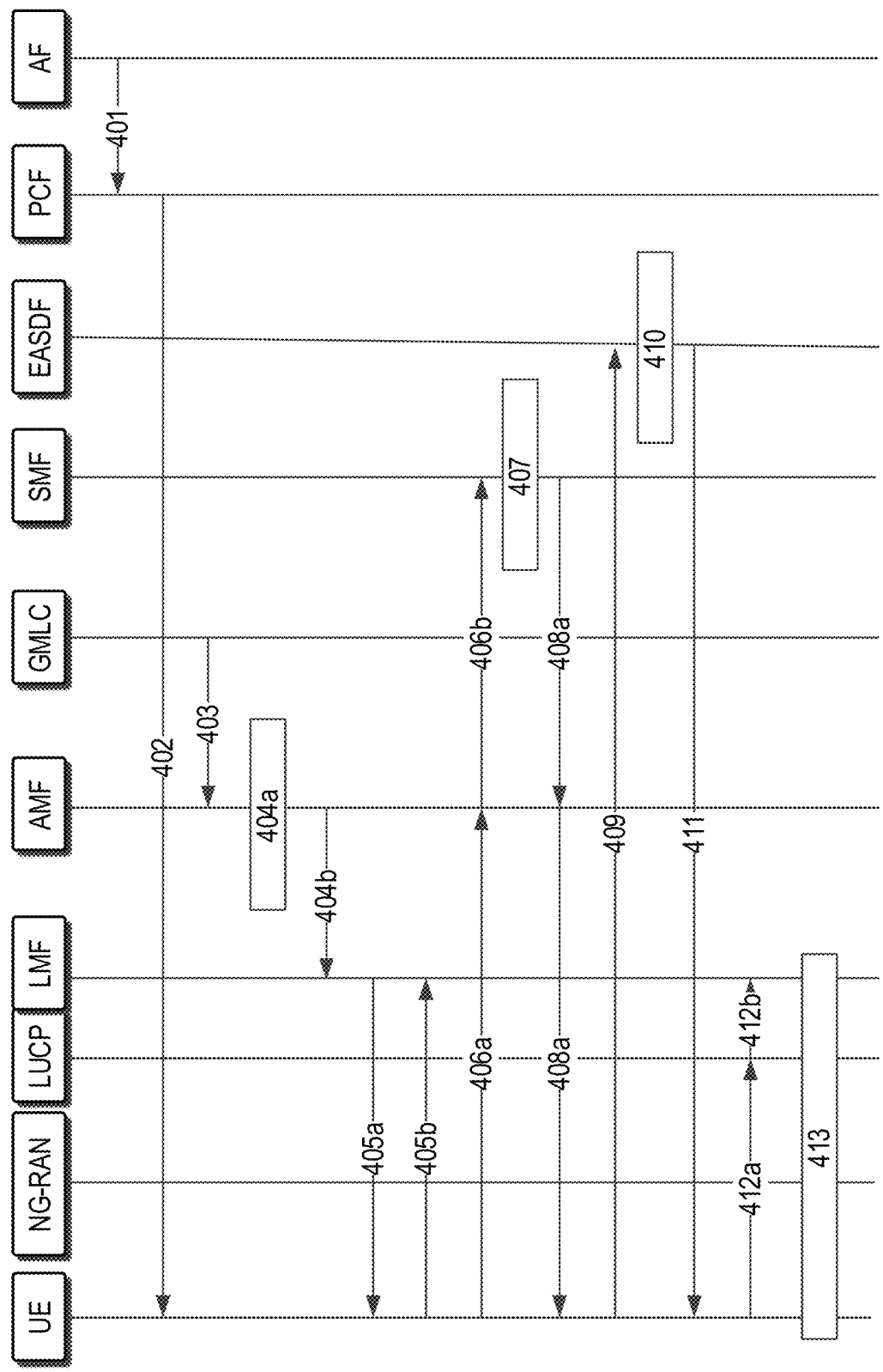
FIG. 4 illustrates a signaling chart illustrating an example process according to some example embodiments of the present disclosure.

FIG. 4 illustrates an example signaling chart 400 for enabling LUCP based enhancement to CP location service. It is noted that the signaling chart 400 is provided merely for illustrative purposes and the present disclosure is not limiter thereto.

As illustrated in FIG. 4, when a LCUP is deployed in a network, the OAM associated with location (acting e.g. as an AF) may provide 401 guidance for URSP rule setting for UE(s) as defined in TS 23.548 Section 6.6. This guidance can be used by PCF in 102 to set URSP rules. The AF may further configure EAS Deployment Information related with the LCUP via the procedure as defined in 23.548 Section 6.2.3.4.

The PCF (in HPLMN) sets URSP rules based on the guidance in 401 and sends 402 the URSP rules to the UE. The URSP rules define rules of mapping FQDN of the LCUP to the relevant dnn+slice (where the slice corresponds to S-NSSAI) according to 3GPP TS 23.502 Section 4.16.11/4/6/12 and 3GPP TS 23.503.

Figure 6:
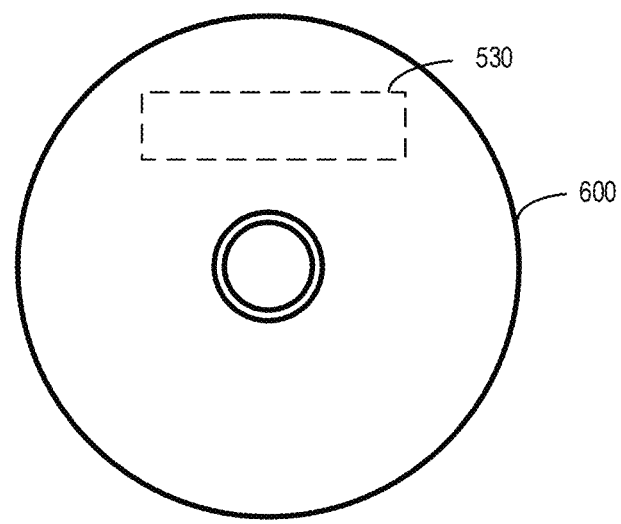
FIG. 6 illustrates a block diagram of an example computer readable medium in accordance with some example embodiments of the present disclosure.

When a CP procedure such as defined in TS 23.273 for MT-LR, or in FIG. 6.2-1 of TS 23.273: 5GC-MO-LR procedure, takes place, for example, the GMLC can send 403 a Namf_Location_ProvidePositioningInfo request to AMF.

The AMF selects 404a, as part of the procedure, a serving LMF and requests 404b the LMF to carry out the location operation using Nlmf_Location_DetermineLocation.

The LMF sends 405a LPP signaling to the UE (this is carried via NAS and AMF) in 405a, to provide the LCUP assistance information as described with FIGS. 2 and 3. For example, the LMF may provide LCUP assistance information (over LPP) to indicate to the UE that the network supports a LCUP. The LPP signaling may be a first Request Capability message from LMF to UE. In such a case, the UE could further indicate whether it supports contacting the LCUP for this LCS request in Request Capability Response message in 405b.

The LCUP assistance information could be provided in the Provide Assistance LPP message replied to the Request Assistance LPP message. Any CP positioning related signaling from the network may actually be used for LMF to deliver the LCUP assistance information to the terminal device thus reference to Provide Assistance and Request Capability message LPP messages is mostly for illustrative purpose. In any case, the LPP signaling goes via the AMF and the NG RAN. It has to be noted that even though NG RAN is indicated as the access Network between the UE and the Core Network (AMF, LMF, SMF, etc. . . . ), the procedure described in this invention can run over any Access Network including e.g. TNGF, W-AGF (defined in 3GPP TS 23.501 and TS 23.316)

The LCUP assistance information could include at least one of addressing information (for example FQDN) of the LCUP instance, security material of UP connection establishment, correlation information on the on-going CP location procedure. The LCUP assistance information could further include Positioning Methods or protocols supported by the LCUP function instance, and possibly a TCP or UDP port at the LCUP. For details about the LCUP assistance information, please refer to those described with reference to FIGS. 2 and 3.

After having received the LCUP assistance information, the UE could try to contact the LCUP whose addressing information e.g. FQDN it has received from the LMF and use the URSP rules received in 402 to establish a relevant PDU Session. For example, the UE may obtain the FQDN of the LCUP in LCUP assistance information and map it to a FQDN range of a pre-configured URSP rule to determine a relevant dnn+slice based on mappings in the FQDN rule. Thus, the PDU establishment request to the proper network slice related with the LCUP instance could be first routed to AMF in 406a and then routed to SMF in 406b.

If the SMF has been configured in 401 to use an EASDF for this PDU Session (for the dnn+slice) as part of the establishment of this PDU Session, the SMF selects, inserts and controls an EASDF as defined in TS 23.548 Section 6.2. The SMF configures the EASDF for the session with DNS message handling rules referring to the EDI (configured in 401) associated with the standard defined FQDN range (for example *.LMF.5gc.mncMNC>.mcc<MCC>0.3gppnetwork.org) in order to trigger offload for the related traffic.

After the PDU session establishment completes, the SMF sends 408a a PDU session establishment complete message to the AMF and the AMF forwards 408b the message to the UE.

The UE tries to get the IP address of the LCUP by sending 409 a DNS query request. The EASDF can be used in 410 to ensure a local UPF is used between the UE and LCUP as defined in 3GPP TS 23.548. The UE receives 411 the IP address of the LCUP (could receive more than one IP address).

The UE contacts 412a the LCUP and establishes a secured connection with the LCUP using security material and correlation information. The LCUP determines the propose LMF based on the LMF address in the correlation and contact 412b the LMF. The LMF uses the positioning request identifier in correlation information to retrieve the on-going positioning request for this device and maps the LCS requests about the UE with the UP data path with the UE via the LCUP. Thus, a location determination procedure can take place 413 using the LCUP for communication between the UE and the LMF in 413.

Example Apparatus

Figure 5:
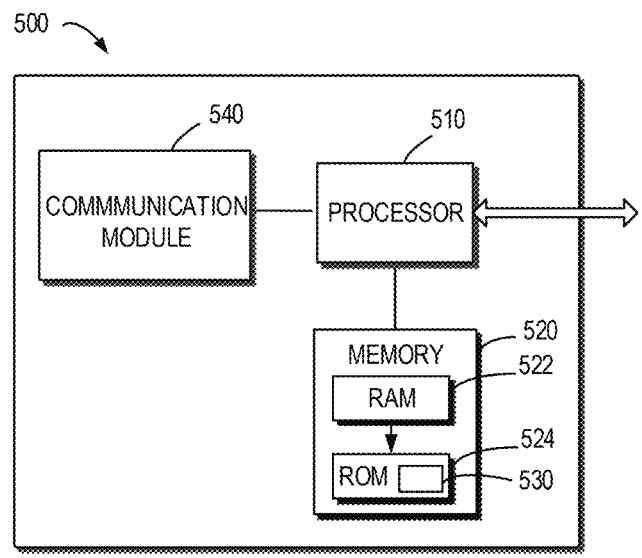
FIG. 5 illustrates a simplified block diagram of a device that is suitable for implementing embodiments of the present disclosure.

FIG. 5 is a simplified block diagram of a device 500 suitable for implementing embodiments of the present disclosure. For example, the terminal device 101, the network element such as LMF, LUCP, SMF, AFM. AF, PCF, GLMC, EASDF, etc., shown in FIGS. 1 and 4 may be implemented by the device 500. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital versatile disc (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any method or process of the disclosure as discussed with reference to FIGS. 2-4. The embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 800 in form of CD or DVD. The computer readable medium has the program 530 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 500 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 500 may be instead comprised in the distributed unit, and at least some of the described processes may be performed by the distributed unit.

In an embodiment, the execution of at least some of the functionalities of the device 500 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 500 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out method 200, 300, or process 400 as described above with reference to FIGS. 2-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
at least one processor; and
at least one memory including computer program codes;
the at least one memory and the computer program codes are configured to, with the at least one processor, cause the terminal device to:
receive location service user plane (LCUP) assistance information in a control plane (CP) positioning protocol signaling, wherein the LCUP assistance information includes at least one of addressing information of an LCUP function instance and security information for establishing an user plane (UP) session between the terminal device and the LCUP function instance, and wherein the LCUP function instance is associated with a location management function (LMF) selected for serving the terminal device; and
establish a secure UP connection between the terminal device and the LCUP function instance by using the LCUP assistance information so as to perform a positioning operation using the LCUP function instance.

2. The terminal device of claim 1, wherein the addressing information of the LCUP function instance includes at least a full qualified domain name (FQDN) specific to the LCUP function instance.

3. The terminal device of claim 2, wherein the terminal device is further caused to establish a protocol data unit (PDU) session based on the FQDN of the UP instance and pre-configured UE routing selection policy (URSP) rule containing information on routing rules related to different FQDN ranges, in order to communicate with the LCUP function instance.

4. The terminal device of claim 3 wherein the PDU session is selected or established by mapping a FQDN range corresponding to the FQDN of the LCUP function instance to a data network name and a network slice based on the URSP rules.

5. The terminal device of claim 1, wherein the CP positioning protocol signaling comprises a capability indication message indicating that the network supports a UP function for location purposes.

6. The terminal device of claim 1 wherein the CP positioning protocol signaling comprises an assistance providing message transmitted from the LMF to the terminal device.

7. The terminal device of claim 1 wherein the terminal device is further caused to transmit a CP positioning protocol signaling to indicate that the terminal device supports a UP function for location purposes.

8. The terminal device of claim 1, wherein the LCUP assistance information further comprises one or more of information on a port at the LCUP function instance and on positioning methods or protocols supported by the LCUP function instance.

9. The terminal device of claim 1, wherein the security information comprises transport layer security attribute information for establishing the secured UP connection.

10. The terminal device of claim 9, wherein the security information further comprises a hash-based message authentication code field.

11. The terminal device of claim 1, wherein the terminal device is further caused to:
transmit a PDU session establishment request to the network to establish the PDU session using the full qualified domain name (FQDN) of the UP instance and the pre-configured UE routing selection policy (URSP); and
receive a PDU session establishment complete message from the network.

12. The terminal device of claim 1, wherein the terminal device is further caused to:
transmitting a domain name server (DNS) request to translate the FQDN of the LCUP function instance into an IP address.

13. The terminal device of claim 1, wherein the terminal device is further caused to:
establish the secured connection with the LCUP instance by using at least one of the correlation information and the security information received in the LCUP assistance information, wherein the correlation information is to identify a corresponding on-going location procedure associated with the secured connection.

14. A network device, comprising:
at least one processor; and
at least one memory including computer program codes;
the at least one memory and the computer program codes are configured to, with the at least one processor, cause the network system to:
transmit location service user plane (LCUP) assistance information in a control plane (CP) positioning protocol signaling,
wherein the LCUP assistance information includes at least one of addressing information of an LCUP function instance and security information for establishing a user plane (UP) session between the terminal device and the LCUP function instance, and
wherein the LCUP function instance is associated with the LMF selected for serving the terminal device.

15. The network device of claim 14, wherein the CP positioning protocol signaling comprises a capability indication message indicating that the network supports a UP function for location purpose.

16. The network device of claim 14, wherein the CP positioning protocol signaling comprises an assistance providing message transmitted to the terminal device.

17. The network device of claim 14, wherein the network device is further caused to:
receive correlation information from the LUCP function instance establishing an UP connection; and
correlate the UP connection with a corresponding on-going CP location procedure based on the correlation information.

18. A method, comprising:
receiving location service user plane (LCUP) assistance information in a control plane (CP) positioning protocol signaling, wherein the LCUP assistance information includes at least one of addressing information of an LCUP function instance and security information for establishing an user plane (UP) session between the terminal device and the LCUP function instance, and wherein the LCUP function instance is associated with a location management function (LMF) selected for serving the terminal device; and
establishing a secured UP connection between the terminal device and the LCUP function instance by using the LCUP assistance information so as to perform a positioning operation using the LCUP function instance.

19. The method of claim 18, wherein the addressing information of the LCUP function instance includes at least a full qualified domain name (FQDN) specific to the LCUP function instance.

20. The method of claim 18, the method further comprising: establishing a protocol data unit (PDU) session based on the FQDN of the UP instance and pre-configured UE routing selection policy (URSP) rule containing information on routing rules related to different FQDN ranges, in order to communicate with the LCUP function instance.

* * * * *